US008572747B2

(12) United States Patent  
Berg et al.

(10) Patent No.: US 8,572,747 B2
(45) Date of Patent: Oct. 29, 2013

(54) POLICY-DRIVEN DETECTION AND VERIFICATION OF METHODS SUCH AS SANITIZERS AND VALIDATORS

(75) Inventors: Ryan Berg, Sudbury, MA (US); Marco Pistoia, Amawalk, NY (US); Takaaki Tateishi, Yamato (JP); Omer Tripp, Har-Adar (IL)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 12/950,049

(22) Filed: Nov. 19, 2010

(65) Prior Publication Data

US 2012/0131668 A1 May 24, 2012

(51) Int. Cl.
*G06F 9/455* (2006.01)
(52) U.S. Cl.
USPC .................. 726/25; 726/22; 726/23; 726/24; 726/26; 717/127; 717/131
(58) Field of Classification Search
USPC ............................... 726/22–25; 717/127, 131
See application file for complete search history.

(56) References Cited

U.S. PATENT DOCUMENTS

| 7,392,545 | B1 * | 6/2008 | Weber et al. | 726/25 |
|---|---|---|---|---|
| 7,530,107 | B1 * | 5/2009 | Ono et al. | 726/25 |
| 2005/0273860 | A1 * | 12/2005 | Chess et al. | 726/25 |
| 2008/0134151 | A1 * | 6/2008 | Koseki et al. | 717/131 |
| 2010/0083240 | A1 * | 4/2010 | Siman | 717/144 |

OTHER PUBLICATIONS

Henriksen, et al, "MONA: Monadic Second-Order Logic in Practice", BRICS, Basic Research in Computer Science. BRICS Report Series RS-95-21, ISSN 0909-0878, May 1995, 11 pages.
Geay, et al, "Modular String-Sensitive Permission Analysis with Demand-Driven Precision", ICSE (International Conference on Software Engineering) (2009), pp. 1-11.
Topnik, et al., "jMosel: A Flexible Tool-Set for Monadic Second-Order Logic on Strings", 13th SPIN Workshop on Model Checking Software, Vienna, Austria (2006), 11 pages.
"Overview Package Class Index", http://www.brics.dk/grammar/doc/dk/brics/grammar/operations/Automaton2Grammar.html; downloaded on Apr. 10, 2013 but the reference has a copyright statement of "2005-2008"; 3 pgs.

* cited by examiner

*Primary Examiner* — Beemnet Dada
*Assistant Examiner* — Kalish Bell
(74) *Attorney, Agent, or Firm* — Harrington & Smith

(57) ABSTRACT

A method includes performing a static analysis on a program having sources and sinks to track string flow from the sources to the sinks. The static analysis includes, for string variables in the program that begin at sources, computing grammar of all possible string values for each of the string variables and, for methods in the program operating on any of the string variables, computing grammar of string variables returned by the methods. The static analysis also includes, in response to one of the string variables reaching a sink that performs a security-sensitive operation, comparing current grammar of the one string variable with a policy corresponding to the security-sensitive operation, and performing a reporting operation based on the comparing. Apparatus and computer program products are also disclosed.

17 Claims, 5 Drawing Sheets

US 8,572,747 B2

POLICY-DRIVEN DETECTION AND VERIFICATION OF METHODS SUCH AS SANITIZERS AND VALIDATORS

BACKGROUND

This invention relates generally to analysis of software programs such as object code, byte code, executable code, and libraries, and, more specifically, relates to static analysis of software programs.

A static analysis is performed by examining program code for a program statically, that is, without executing the program. Static analysis has certain benefits, such as for analyzing Web applications. Web applications have become a main method to conduct business today. Web applications could not be functional if they did not accept and manipulate inputs from end users. However, accepting inputs from end users may be problematic.

SUMMARY

In an exemplary embodiment of the invention, a method includes performing a static analysis on a program having sources and sinks to track string flow from the sources to the sinks. The static analysis includes, for string variables in the program that begin at sources, computing grammar of all possible string values for each of the string variables and, for methods in the program operating on any of the string variables, computing grammar of string variables returned by the methods. The static analysis also includes, in response to one of the string variables reaching a sink that performs a security-sensitive operation, comparing current grammar of the one string variable with a policy corresponding to the security-sensitive operation, and performing a reporting operation based on the comparing. Apparatus and computer program products are also disclosed.

In another exemplary embodiment, an apparatus is disclosed that includes a user interface providing indicia for a user-defined method. The user-defined method is one of a sanitizer or a validator. The providing the indicia is responsive to a static analysis having been performed on a program having sources and sinks that tracked string flow from the sources to the sinks The user defined method is in a path from a source to a sink that performs a security-sensitive operation with a string variable, and the indicia indicate for the user-defined method whether current grammar for the string variable meets a policy corresponding to the security-sensitive operation.

DETAILED DESCRIPTION

Figure 1:
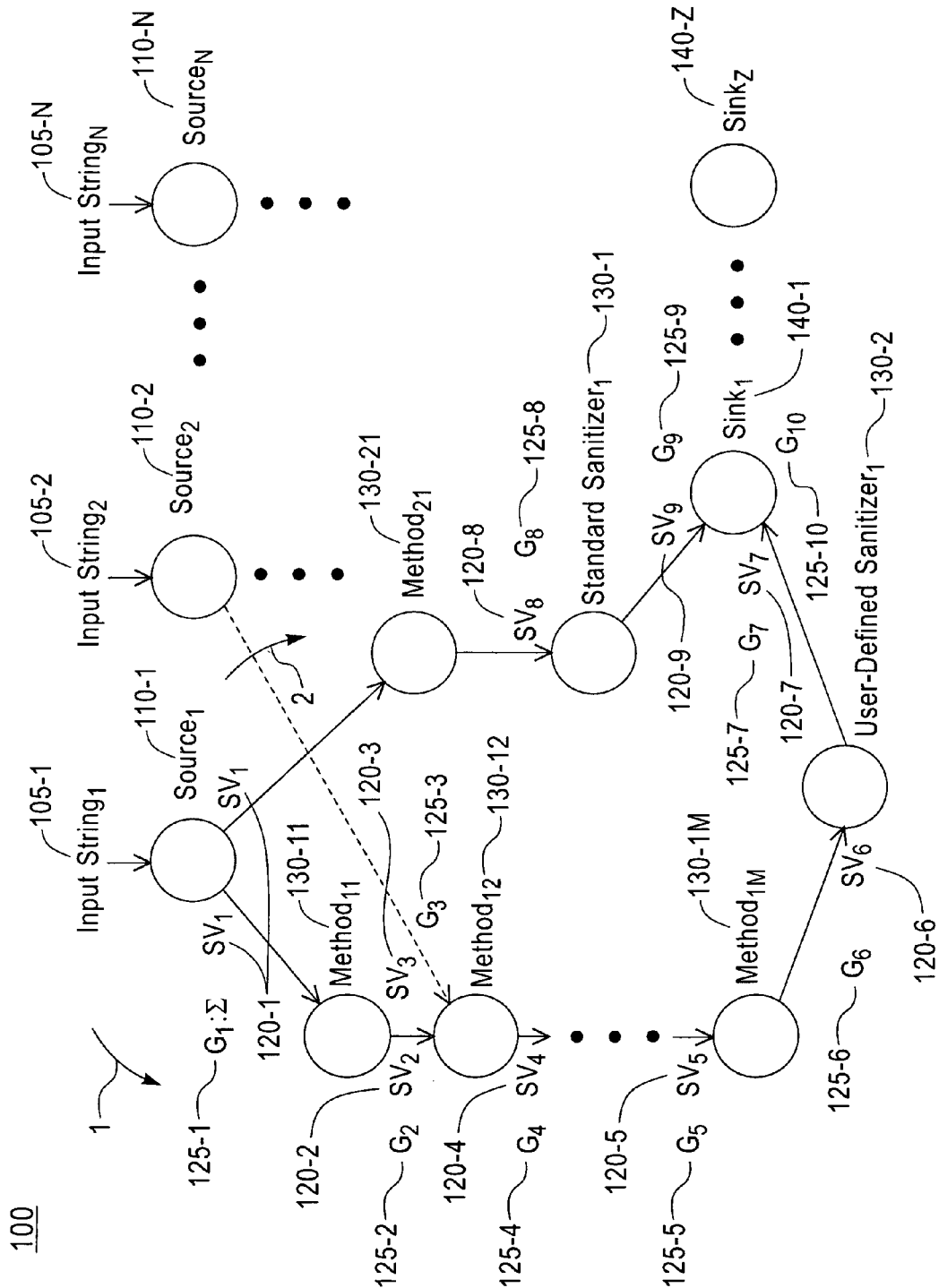
FIG. 1 is an example of a flow representation of a portion of a program to be analyzed for policy-driven detection and verification of methods such as sanitizers and validators.

As stated above, Web applications have become a main method to conduct business today. Web applications could not be functional if they did not accept and manipulate inputs from end users. However, maliciously crafted user input could cause extremely serious damage to backend databases and other computers from other users. For example, user input passed in a Web form as a user identification (ID) and password could be crafted as to contain a Structured Query Language (SQL) command/instruction, which could cause data in a backend database to be permanently damaged, erased, or revealed. This type of attack is called a SQL injection (SQLi).

Similarly, a Web application representing a social application, such as a wiki or a blog, could become a threat to millions of other users if an attacker could publish text comments with embedded JavaScript code. The next user accessing that social application would have that code executed (as opposed to just rendered) on his or her browser. This second type of attack is known as cross-site scripting (XSS).

The Open Web Application Security Project (OWASP) has evaluated that hundreds of thousands of Web applications are vulnerable to SQLi and XSS attacks, as well as other attacks such as malicious file execution (whereby an attacker could modify files or execute programs on the server) and improper error handling (whereby a Web application reveals its inner mechanisms by printing error messages to the browser).

Since a Web application would be useless without being able to accept and manipulate user input, it is necessary for the Web application to perform sanitization operations on the user input before using the input in security-sensitive operations. For example, to prevent SQLi attacks, before using any user-generated input to form a SQL query, a Web application should parse that input and ascertain that that input does not embed SQL commands. Similarly, to prevent XSS attacks, before displaying any user-generated input to a Web browser, a Web application should ascertain that that input does not embed any JavaScript command. This sort of verification is performed through methods that are called sanitizers.

Currently, modern Web applications rely on frameworks that contain policies to which sanitizers must obey. A sanitizer for a particular security-sensitive operation must produce string values that comply with the specification given by the policy. A problem is that many Web applications rely on user-defined, non-standard sanitizers. Therefore, it is difficult to detect which of these sanitizers are correct. Typically, to categorize a sanitizer to identify which vulnerabilities it prevents, and to verify is correctness, manual code review or testing are employed. Manual code review is tedious, time consuming and error prone. Testing is not complete because the testing depends on the input received. This disclosure proposes a sound solution to at least these problems based on static string analysis.

Aspects of the invention describe how to make the detection and verification of sanitizers and validators policy driven, where a policy is, e.g., a white-list policy or a black-list policy. An exemplary embodiment for the detection and verification employs string analysis.

String analysis is a family of static analyses whose purpose is to compute the grammar of the language of all the possible values that a string variable can take during the execution of a program. It is possible to implement a static string analysis solution based on Monadic Second-order Logic (M2L). See, for instance, Topnik, et al., "jMosel: A Flexible Tool-Set for Monadic Second-Order Logic on Strings", 13th SPIN Workshop on Model Checking Software, Vienna, Austria (2006).

Given a policy describing sanitizer specifications in the form of, e.g., a white list, a string analysis can detect whether a Web application is indeed applying sanitization on all the possible paths of execution leading to a security-sensitive operation, and can also detect whether the sanitization is performed correctly.

Unlike manual code inspection and testing, string analysis is sound, in the sense that string analysis over-approximates string values (e.g., by assuming all possible values). Therefore, this solution is guaranteed to report all the problems that could arise at run time. Therefore, if the solution reports that a Web application is safe with respect to a particular security-sensitive vulnerability, the Web application is indeed safe with a very high probability.

An exemplary embodiment of the invention described in this disclosure works as follows. First of all, the string values that can be input by an end user are approximated with the language of the universe of all the possible string values. This is done because no assumption can be made on strings that are input at run time by an unknown Web user. Next, those string values are statically tracked throughout the simulated "execution" of the program (the program is not executed, as the analysis is performed statically). For each function that manipulates strings (for example, by concatenating a string parameter with another string, or by modifying the case of certain characters, replacing substrings, etc.), the string-analysis solution proposed herein computes the appropriate grammar. Once a security-sensitive operation is reached, the grammar of all the string values reaching the sink that performs the security-sensitive operation is computed and compared with the given policy. If the comparison establishes that the computed string values are safe to use in that particular security-sensitive operation, then the Web application is declared safe with respect to the security vulnerability to which that security-sensitive operation could expose the Web application (for example, SQLi or XSS). Otherwise, a potential security problem is reported. It is noted that the security problem is potential because a static analysis may find problems that are infeasible.

Exemplary embodiments of the invention can also be configured. A user can, in fact, configure exemplary embodiments of the invention by indicating that particular constructs in the code are sanitizers (or validators) for certain vulnerabilities. Exemplary embodiments of the invention can then verify those sanitizers (and/or validators) by performing string analysis on them and comparing the results of the analysis with the white-list policy mentioned above. It can then be reported whether the specified sanitizers (and/or validators) are valid or invalid. This technique is particularly useful for user-defined sanitizers and validators, which are non-standard.

Turning to FIG. 1, FIG. 1 shows an example of a flow representation 100 of a portion of a program to be analyzed for policy-driven detection and verification of methods such as sanitizers and validators. The flow representation 100 is, e.g., a control flow graph, call graph, or any other representation useful for tracking paths through a software program. In this example, the nodes are methods and the edges are flows between methods. For simplicity, in this example only flows from sources 110 to sinks 140 are shown. Flows 1 and 2 are shown, starting at source 110-1 (and 110-2) and ending at sink 140-1. In this example, each source 110-1 through 110-N accepts an input string 105-1 through 105-N. It is noted that there could be multiple input strings 105 per source 110.

Flow 1 flows through methods 130-11 to 130-1M and user-defined sanitizer 1 (method 130-2) to the sink 140-1. Flow 2 flows through method 130-21, and a standard sanitizer 1 (method 130-1) (that is, a sanitizer having a known, predetermined output) to the sink 140-1.

String variables (SVs) 120-1 through 120-9 are passed between sources 105, methods 130 and sinks 130. For each string variable 120 that is passed between these nodes, exemplary embodiments herein determine a grammar 125 for the string variable 120. For instance, the grammar 125-1 of the string variable 120-1 is computed in this example as Σ (the alphabet of all characters for a string) because the string variable 120-1 is equivalent to the input string 105-1. The string values that can be input by an end user (e.g., through input string 105-1) are approximated with the language of the universe of all the possible string values. This is done because no assumption can be made on strings that are input at run time by an unknown Web user. This example assumes that the source 110-1 performs no processing on the input string 105-1. For each function (e.g., method 130) that manipulates and returns strings, an exemplary string-analysis solution proposed in this invention computes the appropriate grammar. For example, method 130-12 might concatenate a string in string variable 120-2 with another string in string variable 120-3, and the grammar 125-4 of the resultant string variable 120-4 would be determined using, e.g., the grammars 125-2 and 125-3.

Once a security-sensitive operation is reached at sink 140-1 (in this example), the grammar 125-7 and 125-9 of all the string values (e.g., in the string variables 120-7 and 120-9) reaching the sink is computed and compared with a policy. A policy could be, e.g., $(\Sigma-\{;,'\})^*$, which should prevent SQL injections. As another example, G7, if implemented in Java (a programming language), could be a method such as the following one:

```
public String sanitize(String input) {
    return input.replaceAll(";", "").replaceAll("'", "");
}
```

This method replaces all the semicolons and apostrophes with empty strings, and so it effectively removes semicolons and empty strings. The comparison with the rule is then trivial once the semantics of replaceAll are encoded into transducers, as explained in Geay, et al., "Modular String-Sensitive Permission Analysis with Demand-Driven Precision, ICSE (International Conference on Software Engineering) (2009).

In this example, the sink 140-1 is reached from two different flows 1 and 2 at two different times, and the grammar 125-7 and 125-9 were determined already, e.g., when the string variables 120-7 and les 120-9 were modified by the corresponding methods 130-2 and 130-1. In an example where the sink 140-1 operates using both the strings in string variables 120-7 and 120-9, then a grammar 125-10 would be computed using the grammars 125-7 and 125-9, and grammar 125-10 would be used in the comparison.

In this instance, the method 130-2 is a user-defined sanitizer that is defined as such and will be examined for correct implementation relative to the policy. This is described in more detail blow. It is assumed that the standard sanitizer 130-1 is correctly written, but an exemplary embodiment will also report incorrect implementation with this sanitizer.

Depending on the outcome of the comparison between the grammar and the policy, different reporting operations may be performed. For instance, if the comparison establishes that the computed string values are safe to use in that particular security-sensitive operation, then the Web application is declared safe with respect to the security vulnerability to which that security-sensitive operation could expose the Web application (for example, SQLi or XSS). Otherwise, a potential security problem is reported.

Figure 2:
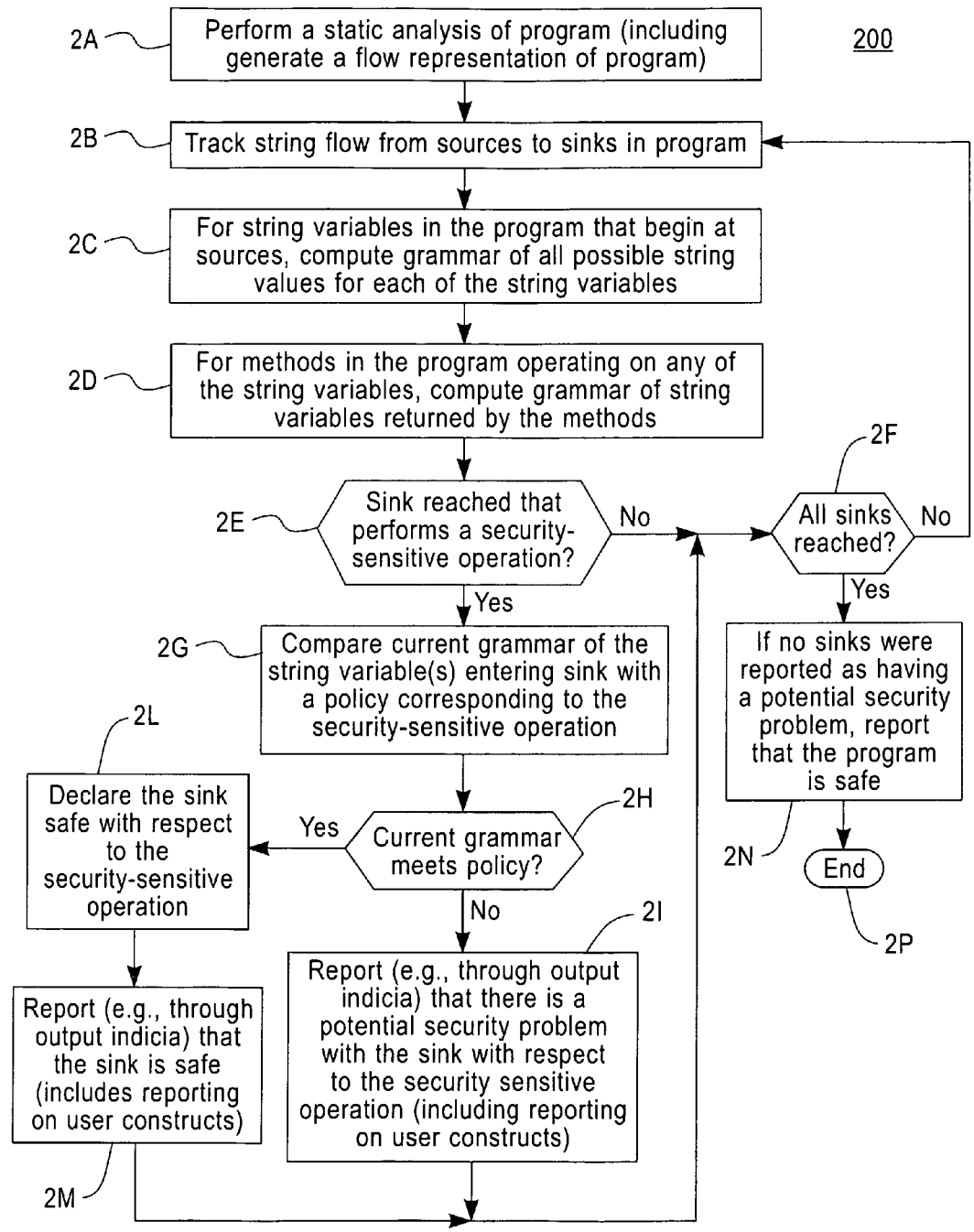
FIG. 2 is a flowchart of an exemplary method for policy-driven detection and verification of methods such as sanitizers and validators.

Turning now to FIG. 2, a flowchart is shown of an exemplary method 200 for policy-driven detection and verification of methods such as sanitizers and validators. Method 200 begins in block 2A, when a static analysis of a program is performed. Most or all of the blocks in method 200 are performed using a static analysis. Block 2A also includes generating a flow representation 100 of a program. In block 2B, string flow is tracked from sources 110 to sinks 140 in the program.

For string variables 120 in the program that begin at sources 110 (e.g., string variables 120-1 and 120-3), the grammar (e.g., grammar 125-1 and 125-3) is computed of all possible string values for each of the string variables 120 (block 2C). In block 2D, for methods in the program operating on any of the string variables, grammar of string variables 120 returned by the methods 130 is computed. For instance, in FIG. 1, the grammar 125-2 of the string variable 120-2 returned by the method 130-11 is computed. Blocks 2C and 2D may be performed through, e.g., techniques presented in Geay, et al., "Modular String-Sensitive Permission Analysis with Demand-Driven Precision, ICSE (International Conference on Software Engineering) (2009).

In block 2E, it is determined if a sink is reached that performs a security-sensitive operation. In one exemplary embodiment, any sink 140 that uses a string from a string variable 120 is assumed to perform a security-sensitive operation. In particular, in an exemplary embodiment, by definition, perform security-sensitive operations on the strings received as input. If so (block 2E=YES), in block 2G, current grammar 125 of the string variable(s) 120 entering a sink 140 is compared with a policy corresponding to the security-sensitive operation. In block 2H, it is determined if current grammar 125 meets the policy. If so (block 2H=YES), the sink 140 is declared to be safe with respect to the security-sensitive operation (block 2L). In block 2M, it is possible to report (e.g., through output indicia) that the sink 140 is safe. In another exemplary embodiment, no report of safe sinks 140 is provided.

Figure 5:
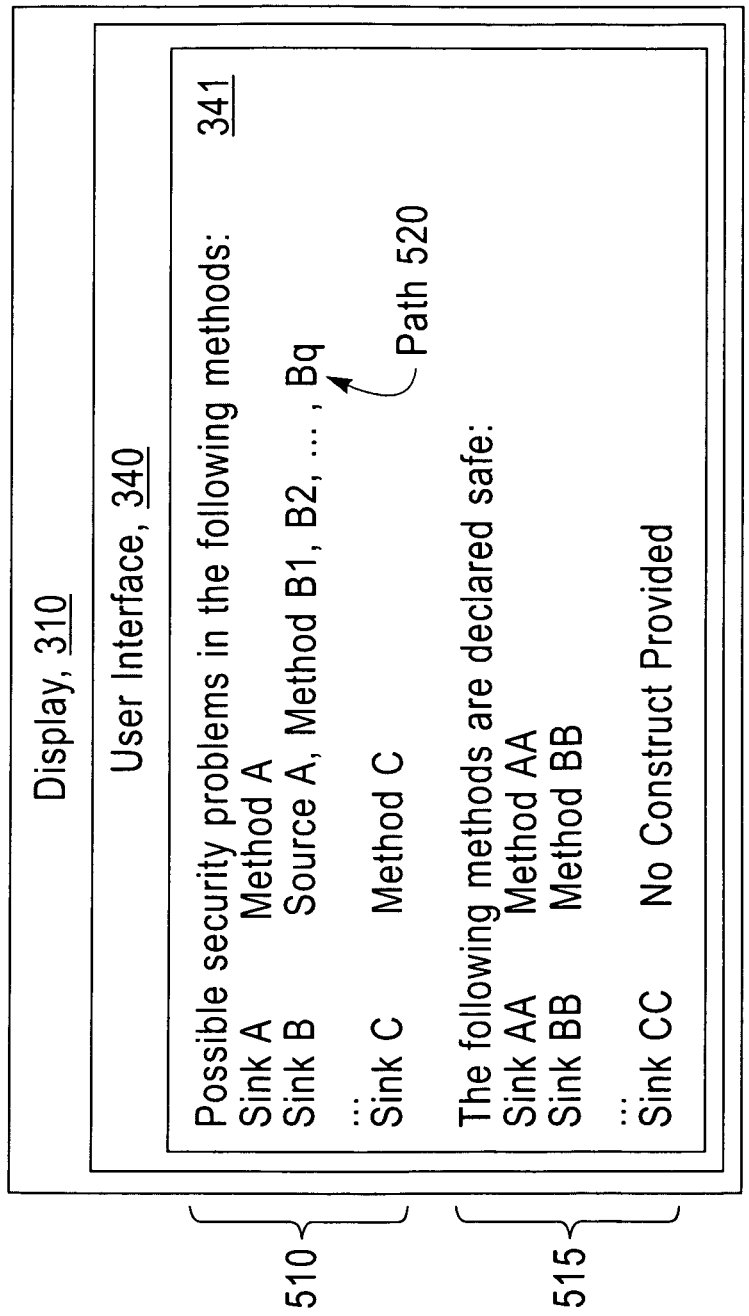
FIG. 5 is an example of a display showing a user interface.

If current grammar 125 does not meet the policy (block 2H=NO), this in an exemplary embodiment is reported in block 2I. For instance, a report (e.g., through output indicia) is made that there is a potential security problem with the sink 140 with respect to the security sensitive operation. Block 2I may also include showing methods along a path to the sink 140, as shown in FIG. 5.

Furthermore, both blocks 2M and 2I may also include reporting on user constructs. In FIG. 1, the user-defined sanitizer, method 130-2, is a user construct. If a user defines the construct (e.g., a portion of code such as a method of an object) as being a sanitizer (or validator), the user-defined construct will be reported on in blocks 2M and 2I. Once path 1 reaches the sink 140-1, it can be determined if the grammar 125-7 of the string variable 120 meets requirements of the policy corresponding to the security-sensitive operation performed by the sink 140-1. If so, the user-defined sanitizer is declared to be a valid sanitizer and a report of such can be made (block 2M). If not, the user-defined sanitizer is declared not to be a valid sanitizer and a report of such can be made (block 2I). From blocks 2M and 2I, the method 200 continues in block 2F.

In block 2F, it is determined whether all sinks have been reached. If so (block 2F=YES), the method 200 reports that the program is safe if no sinks 140 were reported as having a potential security problem (block 2N). The method 200 ends in block 2P. If not (block 2F=NO), the method 200 continues in block 2B.

Figure 3:
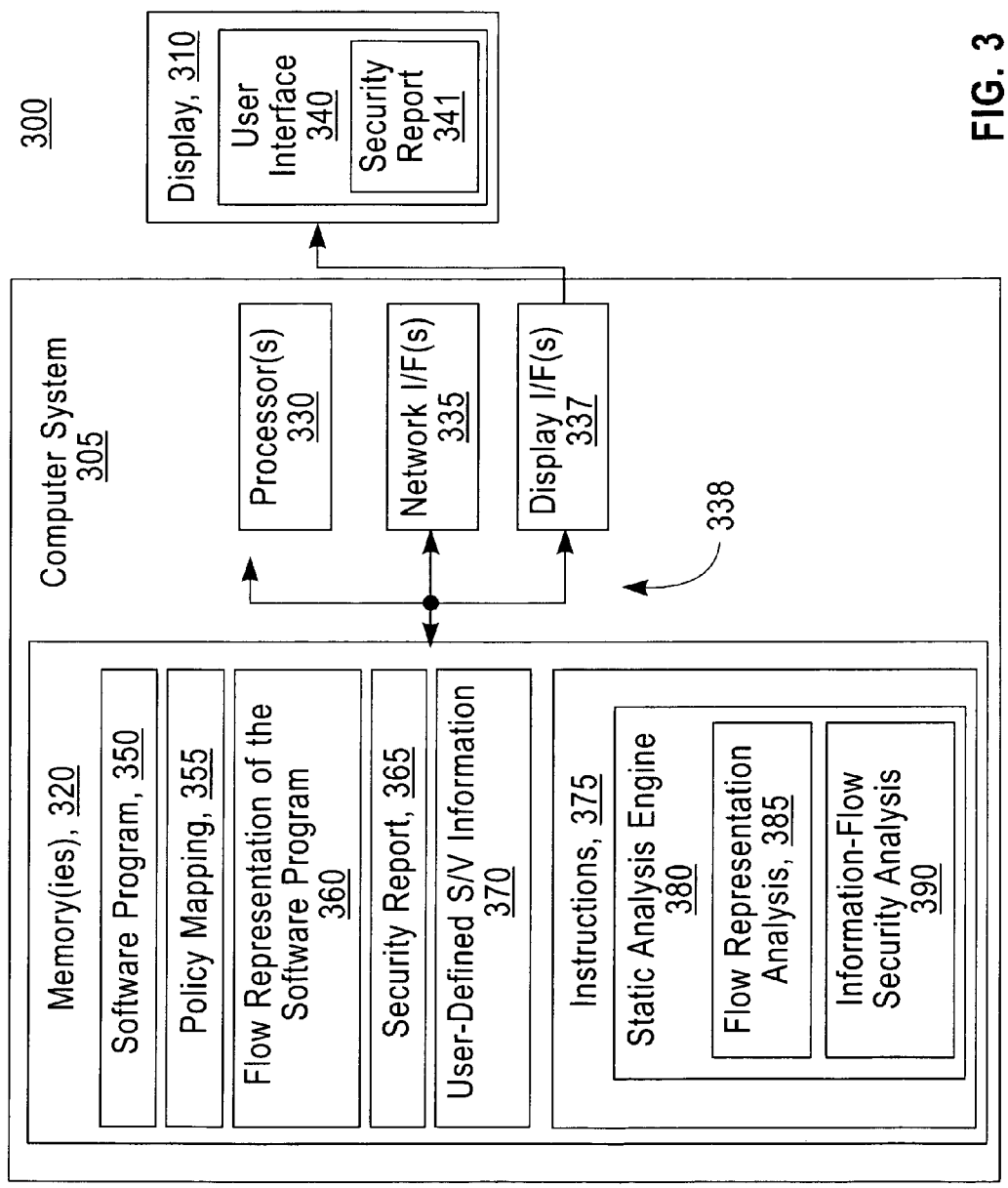
FIG. 3 is a block diagram of an exemplary system for policy-driven detection and verification of methods such as sanitizers and validators.

Referring now to FIG. 3, a block diagram is shown of an exemplary system 300 for policy-driven detection and verification of methods such as sanitizers and validators. The system 300 includes a computer system 305 and a display 310. Computer system 305 includes one or more memories 320, one or more processors 330, one or more network interfaces 335, and one or more display interfaces 337, all connected via one or more buses 338 or other communications links such as Infiniband (an industry-standard specification that defines an input/output architecture used to interconnect servers, communications infrastructure equipment, storage and embedded systems).

The one or more memories include a software program 350, a policy mapping 355, a flow representation 360 of the software program 350, a security report 365, user defined sanitizer/validator (S/V) information 370, and instructions 375. The instructions 375 include a static analysis engine 380 that includes a flow representation analysis tool 385 and an information-flow security analysis tool 390. The instructions 375 contain computer program code that, when executed by the one or more processors 330, cause the computer system 305 to perform one or more of the operations described herein. The display 310 includes a user interface 340 and a security report 341.

The software program 350 is analyzed by the flow representation analysis tool 385, which creates a flow representation 360 of the software program 350. A portion of an exemplary flow representation is shown in FIG. 1. In an exemplary embodiment, the information-flow security analysis tool 390 performs blocks 2B through 2P of FIG. 2. The information-flow security analysis tool 390 uses the policy mapping 355 to determine what policies correlate with which security-sensitive operations. An example of the policy mapping 355 is shown in FIG. 4.

The information-flow security analysis tool 390, in an exemplary embodiment, produces a security report 365 based on the analysis of FIG. 2 on the software program 350. The security report 365 may be sent to a user using, e.g., the one or more network interfaces 335, which could be wired or wireless or some combination thereof. The security report 365 may also be formatted for display to a user as security report 341 on the user interface 340 of display 310. An example of a security report 341 is shown in FIG. 5.

Figure 4:
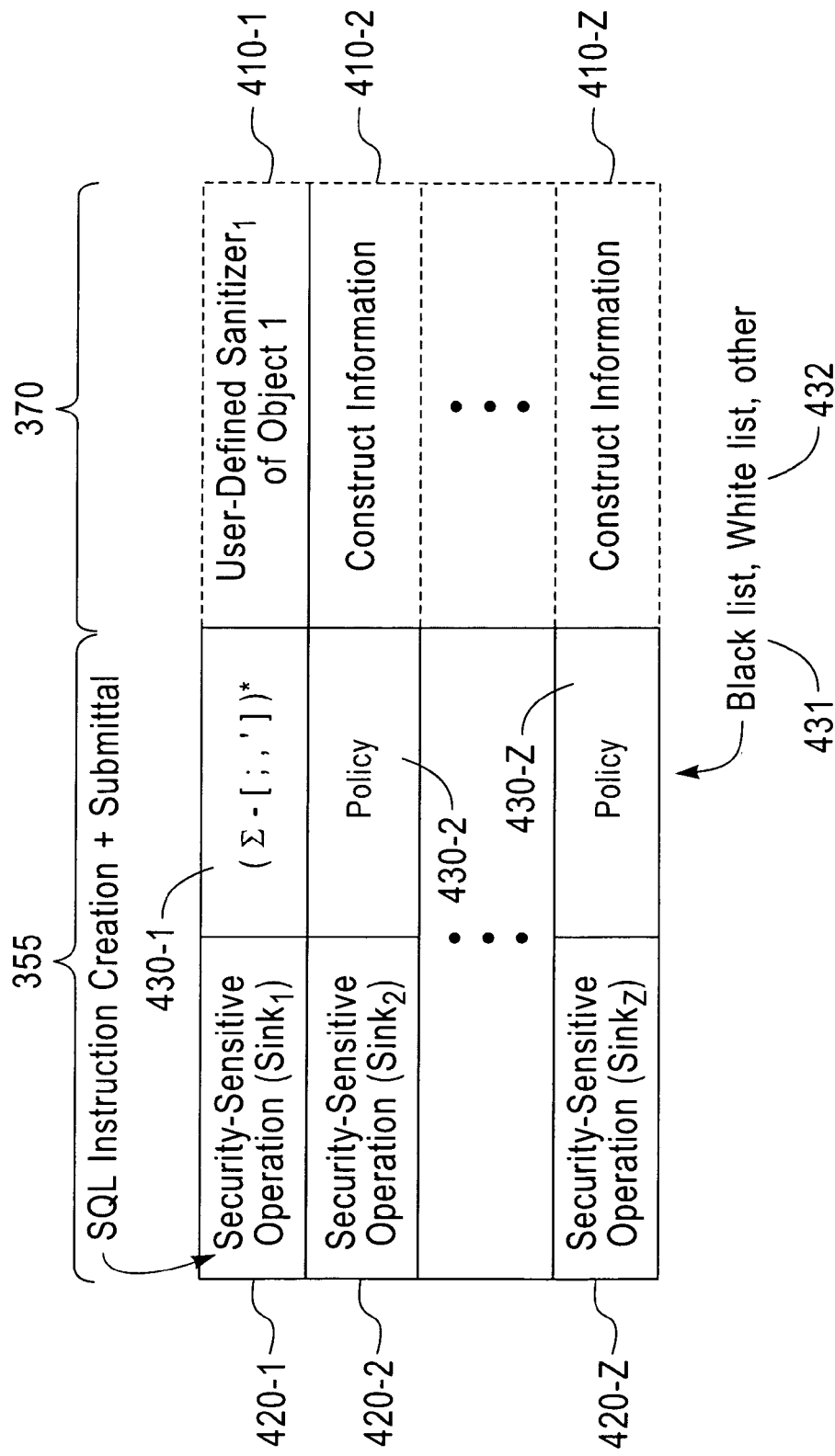
FIG. 4 is a block diagram of exemplary policy mapping and user-defined sanitizer/validator information.

The user-defined S/V information 370 is shown in FIG. 4 but includes information regarding what portions of the software program 350 are constructs that are intended to be sanitizers or validators. This allows a user to configure an exemplary embodiment of the invention by indicating that particular constructs in the code are sanitizers for certain vulnerabilities. The information-flow security analysis tool 390 will then determine whether such constructs actually meet the policies.

FIG. 4 is a block diagram of exemplary policy mapping and user-defined sanitizer/validator information, FIG. 4 shows an exemplary policy mapping 355, coupled with user-defined sanitizer/validator information 370. These may be stored separately or, as shown in FIG. 4, together. The policy mapping 355 includes in this example security sensitive operations 420-1 through 420-$z$. Each security-sensitive operation 420 has a corresponding policy 430-1 through 430-$z$. In this example, each of the security-sensitive operations 420 is to be operated on by a user-defined construct (e.g., a user-defined sanitizer or validator), which is specified by the user using construct information 410-1 through 410-$z$. This is merely exemplary and all security-sensitive operations 420 need not correspond to a user-defined construct.

One user-defined construct is user-defined sanitizer, method 130-2 shown in FIG. 1. The security-sensitive operation 420-1 is, e.g., an SQL instruction creation and submittal to an SQL database. Such an instruction could be created from a username and password entry. A vulnerability corresponding to this operation 420-1 is an SQL injection (SQLi). The construct information 410-1 specifies that the user-defined sanitizer, method 130-2 is a construct. The user-defined sanitizer, method 130-2 returns the output string variable 120-7, from which the grammar 125-7 is determined. The grammar 125-7 is compared with the policy 430-1 of $(\Sigma-\{;, '\})*$, and if the grammar 125-7 meets the policy 430-1, the user-defined construct of the user-defined sanitizer, method 130-2 is determined to meet the policy 430-1. This fact may be reported. If the grammar 125-7 does not meet the policy 430-1, the user-defined construct of the user-defined sanitizer, method 130-2 is determined not to meet the policy 430-1 and this fact is typically reported.

The policies 430 may be black-list policies 431, white-list policies 432, or other policies. It is noted that the security-sensitive operations 420 may also be defined per sink 140. That is, instead of using security-sensitive operations 420, one instead may use indications of sinks 140 in the policy mapping 355. This is because even if a sink could be subject to multiple security-sensitive operations 420 (each corresponding to a different vulnerability), a policy 430 can be determined that prevents the multiple vulnerabilities.

Turning now to FIG. 5, this figure shows an example of a display 310 showing a user interface 340. User interface 340 has a security report 341. In this exemplary security report 341, there are two sections 510, 515. Section 510 reports potential security problems in particular methods (sanitizers or validators), and section 515 reports methods (sanitizers or validators) that are declared safe in that the sink 140 and its associated security-sensitive operation(s) 420 have string variable 120 input(s) where the grammar 125 of the string variable(s) 120 meet the corresponding policy (policies) 430.

In this example, Method A, Method C, Method AA, and Method BB all correspond to user-defined constructs (e.g., method 130) and corresponding construct information 410. The Sink B has no user-defined constructs (e.g., method 130) and corresponding construct information 410 and therefore the path 520 is in this example displayed, e.g., to allow a user to determine how to correct and/or analyze the possible security problem. For Sink CC, no construct or construct information is provided by the user.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    performing by a computer system a static analysis on a program having sources and sinks to track string flow from the sources to the sinks, comprising:
    for string variables in the program that begin at sources, computing by the computer system grammar of possible string values for each of the string variables;
    for methods in the program operating on any of the string variables, computing by the computer system grammar of string variables returned by the methods;
    determining by the computer system that one of the string variables reaches a sink that performs a security-sensitive operation;
    determining by the computer system that one of methods in a path from a source to the sink that performs the security-sensitive operation is one of a user-defined sanitizer or a user-defined validator;
    in response to the one of the string variables reaching the sink and to the one of the methods in the path being one of a user-defined sanitizer or a user-defined validator, comparing by the computer system current grammar of the one of the string variables with a policy corresponding to the security-sensitive operation and determining by the computer system based on the comparing whether the one of the user-defined sanitizer or the user-defined validator presents or does not present a possible security problem; and
    performing by the computer system a reporting operation based on the comparing, wherein performing the reporting operation further comprises reporting, in response to the comparing, whether the one of the user-defined sanitizer or the user-defined validator presents or does not present the possible security problem, wherein the performing the reporting operation further comprises declaring the sink safe with respect to the security-sensitive operation in response to the one of the user-defined sanitizer or the user-defined validator not presenting the possible security problem and outputting indicia indicating the one of the user-defined sanitizer or the user-defined validator appears safe, and wherein the performing the reporting operation further comprises declaring the sink unsafe with respect to the security-sensitive operation in response to the one of the user-defined sanitizer or the user-defined validator presenting the possible security problem and outputting indicia indicating the one of the user-defined sanitizer or the user-defined validator has a possible security problem.

2. The method of claim 1, wherein a plurality of string variables reach the sink, and wherein comparing comprises comparing, for each of the string variables, current grammar of the string variable with a policy corresponding to the security-sensitive operation.

3. The method of claim 1, wherein the current grammar of the one of the string variables meets the policy, and the reporting operation declares the sink safe with respect to the security-sensitive operation.

4. The method of claim 1, wherein the current grammar of the one string variable meets the policy, the comparing is performed for all of the sinks that perform security sensitive operations, and the performing the reporting operation comprises declaring the program safe with respect to the security-sensitive operations and outputting indicia corresponding to the declaring.

5. The method of claim 1, wherein the current grammar of the one string variable does not meet the policy, and the reporting operation declares that a potential security problem exists for the sink and the corresponding security-sensitive operation.

6. A computer program product, comprising:
    a non-transitory computer readable storage medium having computer readable program code embodied therewith, the computer readable program code comprising code suitable to cause a computer system to perform at least the following:
    performing a static analysis on a program having sources and sinks to track string flow from the sources to the sinks, comprising:
    for string variables in the program that begin at sources, computing grammar of all possible string values for each of the string variables;
    for methods in the program operating on any of the string variables, computing grammar of string variables returned by the methods;
    determining that one of the string variables reaches a sink that performs a security-sensitive operation;
    determining that one of methods in a path from a source to the sink that performs the security-sensitive operation is one of a user-defined sanitizer or a user-defined validator;
    in response to the one of the string variables reaching the sink and to the one of the methods in the path being one of a user-defined sanitizer or a user-defined validator, comparing current grammar of the one of the string variables with a policy corresponding to the security-sensitive operation and determining based on the comparing whether the one of the user-defined sanitizer or the user-defined validator presents or does not present a possible security problem; and performing a reporting operation based on the comparing, wherein performing the reporting operation further comprises reporting, in response to the comparing, whether the one of the user-defined sanitizer or the user-defined validator presents or does not present the possible security problem, wherein the performing the reporting operation further comprises declaring the sink safe with respect to the security-sensitive operation in response to the one of the user-defined sanitizer or the user-defined validator not presenting the possible security problem and outputting indicia indicating the one of the user-defined sanitizer or the user-defined validator appears safe, and wherein the performing the reporting operation further comprises declaring the sink unsafe with respect to the security-sensitive operation in response to the one of the user-defined sanitizer or the user-defined validator presenting the possible security problem and outputting indicia indicating the one of the user-defined sanitizer or the user-defined validator has a possible security problem.

7. The computer program product of claim 6, wherein a plurality of string variables reach the sink, and wherein comparing comprises comparing, for each of the string variables, current grammar of the string variable with a policy corresponding to the security-sensitive operation.

8. The computer program product of claim 6, wherein the current grammar of the one of the string variables meets the policy, and the reporting operation declares the sink safe with respect to the security-sensitive operation.

9. The computer program product of claim 6, wherein the current grammar of the one string variable meets the policy, the comparing is performed for all of the sinks that perform security sensitive operations, and the performing the reporting operation comprises declaring the program safe with respect to the security-sensitive operations and outputting indicia corresponding to the declaring.

10. The computer program product of claim 6, wherein the current grammar of the one string variable does not meet the policy, and the reporting operation declares that a potential security problem exists for the sink and the corresponding security-sensitive operation.

11. An apparatus, comprising:
at least one memory comprising computer code; and
at least one processor,
wherein the computer code, when executed by the at least one processor, cause the apparatus to perform at least the following:
performing a static analysis on a program having sources and sinks to track string flow from the sources to the sinks, comprising:
for string variables in the program that begin at sources, computing grammar of possible string values for each of the string variables;
for methods in the program operating on any of the string variables, computing grammar of string variables returned by the methods;
determining that one of the string variables reaches a sink that performs a security-sensitive operation;
determining that one of methods in a path from a source to the sink that performs the security-sensitive operation is one of a user-defined sanitizer or a user-defined validator;

in response to the one of the string variables reaching the sink and to the one of the methods in the path being one of a user-defined sanitizer or a user-defined validator, comparing current grammar of the one of the string variables with a policy corresponding to the security-sensitive operation and determining based on the comparing whether the one of the user-defined sanitizer or the user-defined validator presents or does not present a possible security problem; and performing a reporting operation based on the comparing, wherein performing the reporting operation further comprises reporting, in response to the comparing, whether the one of the user-defined sanitizer or the user-defined validator presents or does not present the possible security problem, wherein the performing the reporting operation further comprises declaring the sink safe with respect to the security-sensitive operation in response to the one of the user-defined sanitizer or the user-defined validator not presenting the possible security problem and outputting indicia indicating the one of the user-defined sanitizer or the user-defined validator appears safe, and wherein the performing the reporting operation further comprises declaring the sink unsafe with respect to the security-sensitive operation in response to the one of the user-defined sanitizer or the user-defined validator presenting the possible security problem and outputting indicia indicating the one of the user-defined sanitizer or the user-defined validator has a possible security problem.

12. The apparatus of claim 11, wherein a plurality of string variables reach the sink, and wherein comparing comprises comparing, for each of the string variables, current grammar of the string variable with a policy corresponding to the security-sensitive operation.

13. The apparatus of claim 11, wherein the current grammar of the one of the string variables meets the policy, and the reporting operation declares the sink safe with respect to the security-sensitive operation.

14. The apparatus of claim 11, wherein the current grammar of the one string variable meets the policy, the comparing is performed for all of the sinks that perform security sensitive operations, and the performing the reporting operation comprises declaring the program safe with respect to the security-sensitive operations and outputting indicia corresponding to the declaring.

15. The apparatus of claim 11, wherein the current grammar of the one string variable does not meet the policy, and the reporting operation declares that a potential security problem exists for the sink and the corresponding security-sensitive operation.

16. An apparatus, comprising:
one or more memories comprising instructions;
one or more processors, the one or more processors configured, in response to execution of the instructions, to cause the apparatus to perform the following:
performing a static analysis on a program having sources and sinks to track string flow from the sources to the sinks, comprising:
for string variables in the program that begin at sources, computing grammar of possible string values for each of the string variables;
for methods in the program operating on any of the string variables, computing grammar of string variables returned by the methods;
determining that one of the string variables reaches a sink that performs a security-sensitive operation;

determining that one of methods in a path from a source to the sink that performs the security-sensitive operation is one of a user-defined sanitizer or a user-defined validator;

in response to the one of the string variables reaching the sink and to the one of the methods in the path being one of a user-defined sanitizer or a user-defined validator, comparing current grammar of the one of the string variables with a policy corresponding to the security-sensitive operation and determining based on the comparing whether the one of the user-defined sanitizer or the user-defined validator presents or does not present a possible security problem; and creating a user interface providing indicia indicating for the user-defined method whether the one of the user-defined sanitizer or the user-defined validator presents a possible security problem or does not present a possible security problem, wherein creating the user interface further comprises declaring the sink safe with respect to the security-sensitive operation in response to the one of the user-defined sanitizer or the user-defined validator not presenting the possible security problem and providing indicia on the user interface indicating the user-defined validator appears safe, and wherein the creating the user interface further comprises declaring the sink unsafe with respect to the security-sensitive operation in response to the one of the user-defined sanitizer or the user-defined validator presenting the possible security problem and providing indicia on the user interface indicating the one of the user-defined sanitizer or the user-defined validator has a possible security problem.

17. The method of claim 1, wherein the one of the user-defined sanitizer or the user-defined validator comprises a user-defined construct comprising a portion of code.

* * * * *